W. T. SMITH.
CHEESE CENTERING DEVICE.
APPLICATION FILED JAN. 3, 1916. RENEWED JUNE 26, 1917.
1,252,189.
Patented Jan. 1, 1918.
2 SHEETS—SHEET 1.
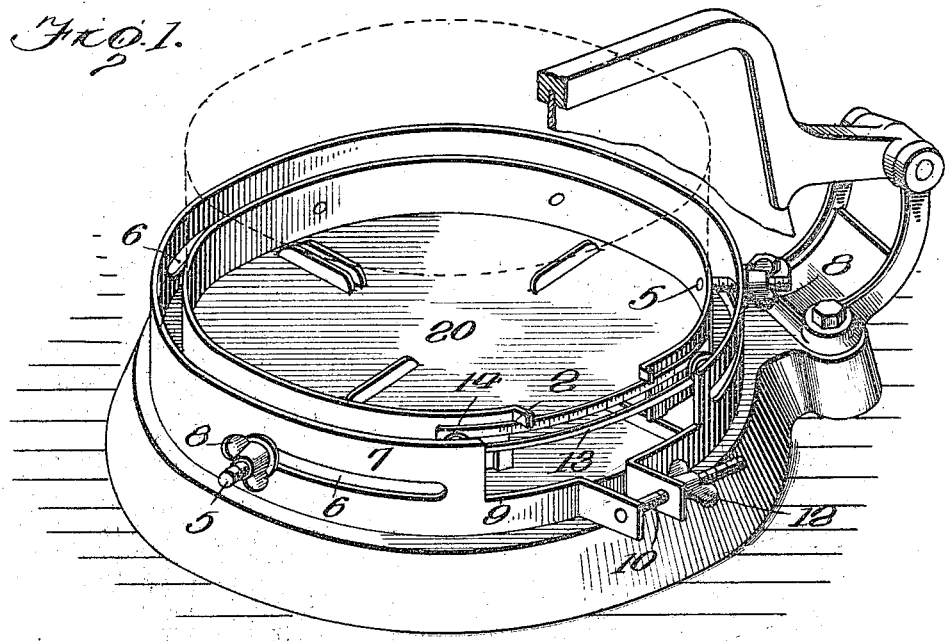
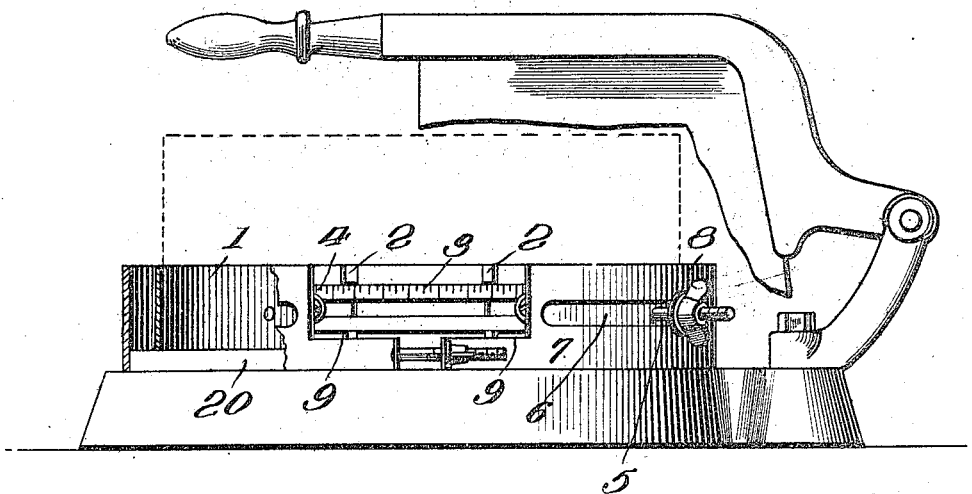
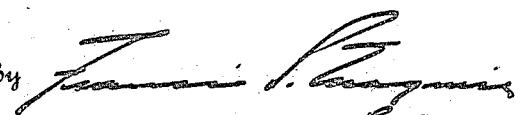

W. T. SMITH.
CHEESE CENTERING DEVICE.
APPLICATION FILED JAN. 3, 1916. RENEWED JUNE 26, 1917.
1,252,189.
Patented Jan. 1, 1918.
2 SHEETS—SHEET 2.
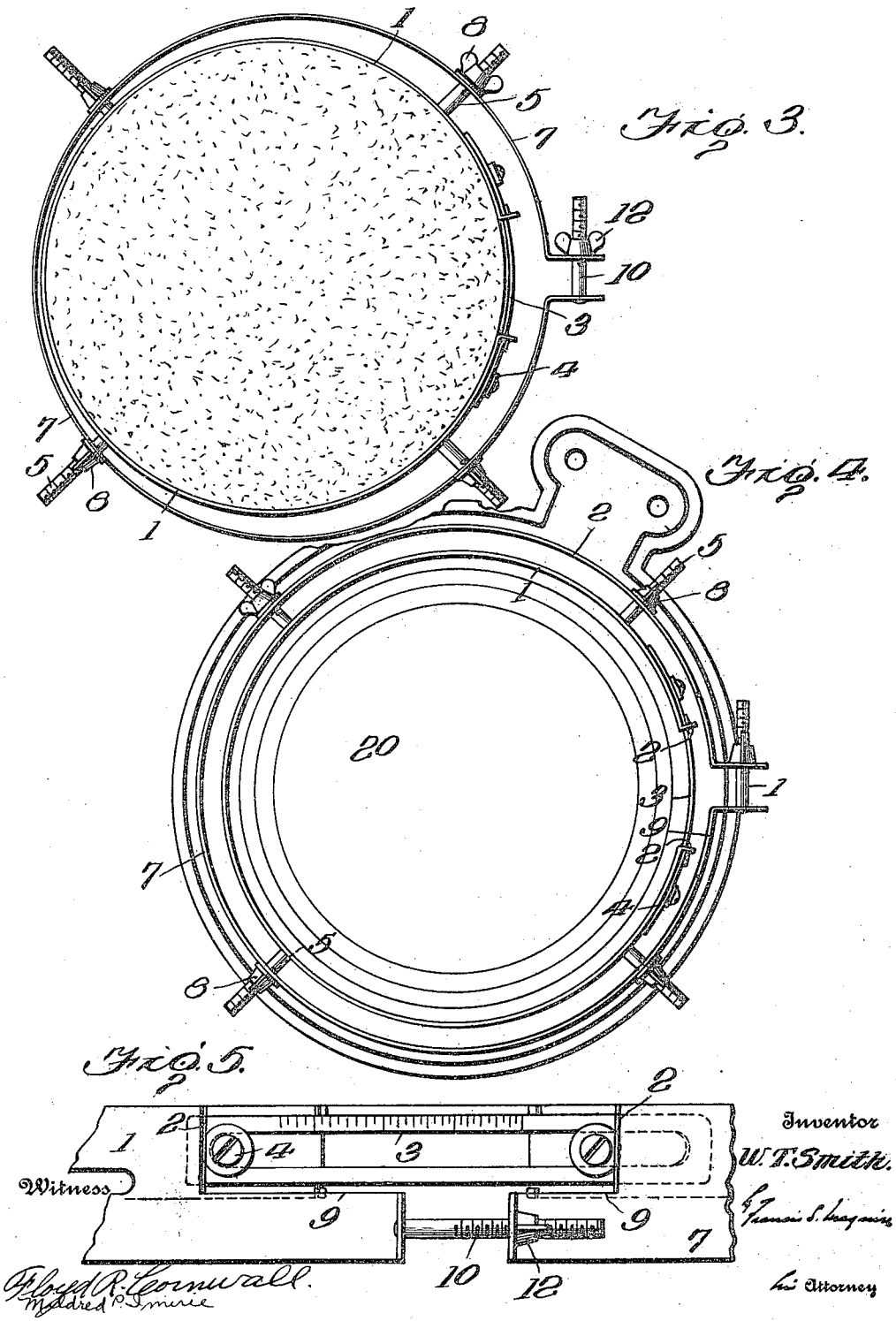

UNITED STATES PATENT OFFICE.

WILLIAM THOMAS SMITH, OF COLUMBIA, SOUTH CAROLINA.

CHEESE-CENTERING DEVICE.

1,252,189.     Specification of Letters Patent.     Patented Jan. 1, 1918.

Application filed January 3, 1916, Serial No. 69,849. Renewed June 26, 1917. Serial No. 177,151.

*To all whom it may concern:*

Be it known that I, WILLIAM T. SMITH, of Columbia, in the county of Richland and State of South Carolina, have invented certain new and useful Improvements in Cheese-Centering Devices; and I do hereby declare the following to be a full, clear, and exact description of the invention, such as will enable others skilled in the art to which it appertains to make and use the same.

My invention relates to cheese cutters, and the object of the invention is to provide an improved and simple attachment for quickly and accurately centering a cheese upon the platform of a computing cheese cutter.

In the accompanying drawings Figure 1 is a perspective showing the platform of a cheese cutter with my attachment applied thereto. Fig. 2 is a similar view in side elevation, parts being shown in section. Fig. 3 is a top plan view showing my attachment adjusted to a cheese. Fig. 4 is a similar view of the attachment but shows it removed from the cheese and placed on the cutter platform for centering purposes. Fig. 5 is an enlarged view of the band adjusting means.

Referring to the drawings, 1 designates an inner circumferential band which is adapted to encircle a cheese and to be adjusted thereto by means of finger pieces 2, the band being held in its adjusted position by means of a slotted gage bar 3, one end of which is fixedly secured to the band and the other adapted for relative movement thereto, the gage and the band being locked when in adjusted position by means of a headed screw 4. The gage bar is preferably marked in inches or with other graduations. Projecting outwardly from the band 1 are a series of threaded short rods 5, which extend through longitudinal slots 6 in an outer band 7, the latter encircling band 1. The rods are provided on their outer ends with washers and thumb nuts 8. The band 7 is of greater depth than the band 1. The upper edges of the inner and outer bands are in approximately the same horizontal plane, and this arrangement causes a portion of the band 7 to extend below the plane of the lower edge of the band 1. This depending portion is designed to engage the platform of a computing cheese cutter. A portion of each end of the band 7 is cut away, as at 9, to allow free access for adjusting the inner band. The extreme ends of the band 7 are bent outwardly and, together with a threaded bolt 10 secured to one of the ends and projecting through the other and a thumb nut 12, form the means for regulating the diameter of the outer band. Preferably both bands are made of thin steel or other flexible material.

In using the attachment, the screw 4 is first loosened which permits of flexing the band 1. This band is then placed around the cheese which it is desired to center on the platform 20 of a cheese cutter, adjustment of the band to the circumference of the cheese being readily effected by the finger pieces 2. When the size has been determined the screw 4 is tightened, thus securing the gage bar to the end of the band 1. The attachment is then lifted from the cheese and is placed on the cheese cutter, the outer band 7 being adjusted to the periphery of the platform 20 and clamped thereto by the binding connection at the ends of the band. The greater depth of the band 7 allows of its ready attachment to the periphery of the platform and permits the lower edge of the band 1 to rest thereon. With the parts in the position described the inner band 1 may be easily and quickly centered on the cheese cutter platform by adjusting the thumb nuts 8 of the threaded rods 5, thus effecting a movement of the inner band relative to the outer, the extent of movement being determined by the usual markings on the cheese cutter platform. When the center has thus been secured the cheese is placed on the platform within the band 1 and the whole attachment is then removed.

It will be apparent that a cheese so centered is placed in position for accurate cutting and that the likelihood of mistakes in computing is avoided.

If the cheese is of such shape that the inner band may not readily be lifted therefrom, the position of the inner band may readily be determined by the graduated marks on the gage bar 3, and after removing the band it can be adjusted to its proper position by simply tightening the screw 4.

I claim as my invention:

1. A centering attachment for cheese cutters comprising an inner member, means by which the diameter of said member may be adjusted, an outer member, means for adjusting the diameter of said outer member, and means adapted to effect a movement of said inner member relatively to said outer member.

2. A centering attachment for cheese cutters comprising an adjustable cheese engaging member, an adjustable platform engaging member, and means connecting said members and designed to effect a movement of said cheese engaging member relatively to said platform engaging member.

3. A centering attachment for cheese cutters comprising a cheese engaging member, means by which the diameter of said member may be adjusted, an outer member having a portion adapted to engage a cheese cutter platform, means for clamping said member to said platform, and means for centering said inner member relatively to said outer member.

4. A centering attachment for cheese cutters comprising a cheese engaging member having spaced-apart ends, an adjustable connection between said ends, an outer member having a portion designed to engage a cheese cutter platform, clamping means therefor, and means connecting said members and adapted to effect a movement of said inner member relatively to said outer member.

5. A centering attachment for cheese cutters comprising a cheese engaging member having spaced-apart ends, an adjustable connection between said ends, threaded rods projecting outwardly from said engaging member, a second member adapted to encircle said cheese engaging member and to be clamped to a cheese cutter platform, said last mentioned member having a series of longitudinal slots through which said bolts are designed to project, and thumb nuts on said bolts for effecting a movement of said inner member relatively to said outer member.

In testimony whereof, I have signed this specification in the presence of two subscribing witnesses.

WILLIAM THOMAS SMITH.

Witnesses:
H. F. JUMPES, Jr.,
J. S. COUNTS.

Copies of this patent may be obtained for five cents each, by addressing the "Commissioner of Patents, Washington, D. C."